United States Patent
Ni et al.

(10) Patent No.: US 8,051,016 B2
(45) Date of Patent: Nov. 1, 2011

(54) SYSTEM AND METHOD OF BILLING FOR PRINTING SERVICE COSTS BY EXAMINING THE CONTENT OF A PAGE

(75) Inventors: Beta Yuhong Ni, West Linn, OR (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 263 days.

(21) Appl. No.: 11/873,113

(22) Filed: Oct. 16, 2007

(65) Prior Publication Data

US 2009/0099980 A1 Apr. 16, 2009

(51) Int. Cl.
*G06Q 99/00* (2006.01)
(52) U.S. Cl. ....... 705/400; 705/7.35; 358/1.15; 358/1.9; 358/3.02; 358/3.09
(58) Field of Classification Search .................. 705/400, 705/1.1; 358/1.8, 1.14, 1.15, 1.9
See application file for complete search history.

(56) References Cited

U.S. PATENT DOCUMENTS

| | | | |
|---|---|---|---|
| 5,822,451 A * | 10/1998 | Spaulding et al. | 382/162 |
| 5,850,474 A | 12/1998 | Fan et al. | |
| 6,064,838 A * | 5/2000 | Maruta et al. | 399/79 |
| 6,240,205 B1 | 5/2001 | Fan et al. | |
| 6,356,359 B1 * | 3/2002 | Motamed | 358/1.8 |
| 6,385,675 B1 | 5/2002 | Yamaguchi | |
| 6,574,443 B1 | 6/2003 | Butikofer | |
| 6,862,110 B2 | 3/2005 | Harrington | |
| 6,972,857 B2 * | 12/2005 | Mantell et al. | 358/1.14 |
| 7,239,422 B2 * | 7/2007 | Braun et al. | 358/1.9 |
| 7,277,191 B2 | 10/2007 | Metcalfe et al. | |
| 7,340,482 B2 | 3/2008 | Abhyankar | |
| 2003/0020951 A1 * | 1/2003 | Minowa et al. | 358/1.15 |
| 2006/0020561 A1 | 1/2006 | Kodimer | |
| 2006/0074816 A1 * | 4/2006 | Hibara et al. | 705/400 |
| 2006/0114494 A1 | 6/2006 | Crosby et al. | |
| 2006/0114497 A1 | 6/2006 | Anderson | |
| 2006/0203277 A1 * | 9/2006 | Suzuki | 358/1.14 |
| 2007/0058188 A1 | 3/2007 | Nakahara | |
| 2009/0109454 A1 | 4/2009 | Nagarajan | |
| 2009/0265286 A1 | 10/2009 | Nagarajan | |
| 2010/0005038 A1 | 1/2010 | Nagarajan | |

FOREIGN PATENT DOCUMENTS

JP 2005-094397 4/2005

OTHER PUBLICATIONS

Plain, Stephen W., "Colorfast: New Color Inkjets Approach Photographic Quality at Bargain-Basement Prices", Feb. 1996, Computer Shopper, v16, n2, p. 130(10).*

* cited by examiner

*Primary Examiner* — John Hayes
*Assistant Examiner* — Freda A Nelson
(74) *Attorney, Agent, or Firm* — Fay Sharpe LLP

(57) ABSTRACT

A method of billing for printing service costs is presented. The method entails examining the content of a page and applying a cost function to approximate the cost of printing the page. Examining the content of the page may include detecting at least one object in the page and determining an approximate area of coverage of the detected object within the at least one object in the page. The cost function can approximate the cost of printing the page using the detected object and the determined approximate area of coverage of the detected object.

16 Claims, 5 Drawing Sheets

| | DETERMINED COST FOR PRINTING A PAGE | PAGE TYPE | TOTAL AREA OF COVERAGE OF MONOCHROME OBJECTS | TOTAL AREA OF COVERAGE OF COLOR OBJECTS | ADDITIONAL REQUIREMENTS |
|---|---|---|---|---|---|
| 312 | C1 | MONOCHROME | LESS THAN T1 | NA | NA |
| 314 | C2 | MONOCHROME | GREATER THAN OR EQUAL TO T1 | NA | NA |
| 316 | C3 | COLOR | NA | LESS THAN T2 | PAGE CANNOT INCLUDE ANY COLOR, G, LFHT, HFHT, SF, OR CON OBJECTS |
| 318 | C4 | COLOR | NA | LESS THAN T3 | G*w1+LFHT*w2+HFHT*w3+SF*w4+CON*w5 MUST BE LESS THAN T4 |
| 320 | C5 | COLOR | NA | GREATER THAN OR EQUAL TO T2 AND (SEE RIGHT) | PAGE CANNOT INCLUDE ANY COLOR, G, LFHT, HFHT, SF OR CON OBJECTS |
| 322 | C5 | COLOR | NA | APPLIES IF GREATER THAN OR EQUAL TO T3 BUT (SEE RIGHT) | INCLUDES COLOR G, LFHT, HFHT, SF, OR CON OBJECTS AND ONE OF: (1) THE TOTAL AREA OF COVERAGE OF THE COLOR OBJECTS IS GREATER THAN OR EQUAL TO T3 OR (2) G*w1+LFHT*w2+HFHT*w3+SF*w4+CON*w5>=T4) |

| COSTS | THRESHOLDS | WEIGHTS | |
|---|---|---|---|
| C1, C2, C3, C4, C5 | T1, T2, T3, T4, T5 | W1, W2, W3, W4, W5 | |
| | | G | TOTAL AREA OF COVERAGE OF COLOR GRAPHIC OBJECTS |
| | | LFHT | TOTAL AREA OF COVERAGE OF COLOR LOW FREQUENCY HALFTONE OBJECTS |
| | | HFHT | TOTAL AREA OF COVERAGE OF COLOR HIGH FREQUENCY HALFTONE OBJECTS |
| | | SF | TOTAL AREA OF COVERAGE OF COLOR SOLID FILL OBJECTS |
| | | CON | TOTAL AREA OF COVERAGE OF COLOR CONTONE OBJECTS |

FIG. 3

SYSTEM AND METHOD OF BILLING FOR PRINTING SERVICE COSTS BY EXAMINING THE CONTENT OF A PAGE

BACKGROUND

1. Technical Field

The present disclosure relates to billing for printing costs, and, in particular, to a system and method for billing for printing service costs by examining the content of a page.

2. Description of Related Art

Modern color printing systems mark a substrate with patterns of lines or small dots of oval or round shape onto the printing substrate (e.g., such as paper). The color printing system can mark the printing substrate with multiple colors of ink or toner called colorants. Although most color printing systems have only four primary colors of toner (or ink), a much wider variety of colors are available for color perception because of physiological and psychophysical aspects of human color vision.

The colors of toner (or ink) chosen to create the wider variety of perceived colors is generally referred to as the color gamut. The most typically used color gamut is the "CMYK" color gamut. The "C" refers to Cyan toner, the "M" refers to "Magenta" toner, the "Y" refers to the "Yellow" toner, and the "K" refers to the "Black" toner. Although there are three types of color receptors in the human eye (and one additional type of receptor for night vision), four toner colors are generally used because black toners are generally cheaper, and it is more efficient to use a black toner than to combine the cyan, magenta, and yellow toners to make a black color, e.g., a black toner dries faster than when combing the three aforementioned toners to make a black marking on a substrate. The cost of the toner (or ink) should be taken into consideration when printing color and/or monochrome pages.

However, the cost of the toner is generally only about 20% to 30% of the total cost per printing substrate (e.g., a page can be printed on a substrate) that is incurred when using a printing system. One business model employed by manufacturers of printing systems is to lease (becoming the "lessor") a printing system to the end user and charge a monthly "use" fee and a "service" fee. The "use" fee is generally fixed; however, the "service" fee includes estimated fixed and variable costs, and a profit margin. Some of the estimated costs that are included in the service fee are toner usage costs, technician costs, repair costs, IT infrastructure costs, field offices costs, managers' and engineers' salaries, parts costs, labor costs, and the like (generally the end user pays for the printing substrate, e.g., paper, however, some end users may contract otherwise).

If the agreed upon fee structure is not properly calculated, the actual costs may exceed expectations reducing the profit margin (possibly causing the lessor to incur a loss). Additionally, an improperly calculated service fee can cause a particular end user to pay more than their proportionate service usage. Thus, miscalculated service costs increase market inefficiencies into the printing system's market. To mitigate the risk of loss to a lessor and to provide the lessee (i.e., end user) with a proportionate service fee, the service cost generally includes a "per click" fee. This fee can facilitate efficient allocation of the resources of both parties.

This "per click" fee is an additional fee that is applied to each particular piece of printed page. The per click fee includes an estimated toner cost, a risk premium cost, and a profit margin. The risk premium cost is an estimated service cost that a particular piece of printing substrate will probabilistically cause the lessor to incur a service expense. Printing a color page has a higher probability of incurring additional service costs as compared to printing a monochrome page.

One approach is to charge a "per click" fee of a fixed amount when an end user prints a page that is purely monochrome, and to charge a different amount for the "per click" fee when printing a color page. This is referred to as the "one size fits all billing approach" and is simply billing one fee for printed monochrome pages and another fee for printed color pages, regardless of the content in the printed page. For example, the "per click" fee may be $0.01 (U.S) per monochrome printed page and $0.08 (U.S.) per color printed page.

The "one size fits all billing approach" does not generally take into account the objects that are in the page. For example, there are several types of monochrome and/or color objects that can be printed onto a substrate. Some of the types of objects that may be printed are: monochrome contone objects, color contone objects, monochrome text objects, color text objects, monochrome line art objects, color line art objects, monochrome graphic objects, color graphic objects, monochrome low frequency halftone objects, color low frequency halftone objects, monochrome high frequency halftone objects, color high frequency halftone objects, monochrome solid fill objects, and color solid fill objects.

In one exemplary prior art method, an approximation of the service cost associated with a particular printed page is made by applying a cost function that uses the aggregate toner area of coverage of the printed page, the printing medium substrate dimensions, and the finishing options applied. The aggregate toner area of coverage may be approximated by counting the aggregate number of color pixels (e.g., counting the number of the CMYK pixels within an object).

The prior art method does not take into account how the color pixels are distributed in a page (e.g., how the pixels are distributed and/or clustered), the kinds of objects in the page the pixels are used to form, and the pixel density.

SUMMARY

The present disclosure relates to billing for printing costs, and, in particular, to a system and method for billing for printing service costs by examining the content of a page.

In one aspect of the present disclosure, a method of billing for printing service costs is provided and includes the steps of: examining content of a page and applying a cost function to approximate a cost of printing the page. The step of examining the content of the page includes detecting at least one object in the page and determining an approximate area of coverage of the detected object (and/or detected objects) within at least one object in the page. The cost function approximates the cost of printing the page using the detected object and the determined approximate area of coverage of the detected object. The step of determining the approximate area of coverage of the detected object may include the step of: counting the number of pixels of the detected object. The objects that may be detectable by the method include: monochrome contone objects, color contone objects, monochrome text objects, color text objects, monochrome line art objects, color line art objects, monochrome graphic objects, color graphic objects, monochrome low frequency halftone objects, color low frequency halftone objects, monochrome high frequency halftone objects, color high frequency halftone objects, monochrome solid fill objects, and color solid fill objects. The method may be implemented by an operative set of processor executable instructions configured for execution by at least one processor.

In another aspect of the present disclosure, the step of detecting the at least one object in the page may include detecting at least one color object and detecting at least one monochrome object. The step of detecting at least one color object may include one or more of the steps of: detecting at least one color contone object, detecting at least one color text object, detecting at least one color line art object, detecting at least one color low frequency halftone object, detecting at least one color high frequency halftone object, and detecting at least one color solid fill object.

In another aspect of the present disclosure, the step of counting the number of pixels of the detected object occurs during ripping of the page and/or by implementing an auto-windowing technique on the page. The page may be a scanned page, an image of a page, a page description language page, a printed page, a copied page, a computer-memory based page, a hard-drive based page, a raster page, and a vector graphics page.

In another aspect of the present disclosure, the cost function can determine that the approximate cost of printing the page is one of a first cost, a second cost, a third cost, a fourth cost, and a fifth cost. The cost function determines that the approximate cost of printing the page is the first cost when the printed page is a purely monochrome page, and the determined area of coverage of the detected at least one object is less than a first predetermined threshold. The cost function determines that the approximate cost of printing the page is the second cost when: the printed page is a purely monochrome page and the determined area of coverage of the detected at least one object is greater than or equal to the first predetermined threshold. The cost function determines that the approximate cost of printing the page is the third cost when: the printed page is not a purely monochrome page, the determined area of coverage of the detected at least one color object is less than a second predetermined threshold, a color graphic object is not detected in the page, a color low frequency halftone object is not detected in the page, a color high frequency halftone object is not detected in the page, a color contone object is not detected in the page, a color solid fill object is not detected in the page, and a color contone object is not detected in the page.

The cost function determines that the approximate cost of printing the page is the fourth cost when the printed page is not a purely monochrome page, the determined area of coverage of the detected at least one color object is less than a third predetermined threshold, and a first weighted average is less than a fourth predetermined threshold. The weighted average is a summation of: the multiplication of the determined approximate area of coverage of a detected at least one color graphic object and a first weight, the multiplication of the determined approximate area of coverage of a detected at least one color low frequency halftone object and a second weight, the multiplication of the determined approximate area of coverage of a detected at least one color high frequency halftone object and a third weight, the multiplication of the determined approximate area of coverage of a detected at least one color solid fill object and a fourth weight, and the multiplication of the determined approximate area of coverage of a detected at least one color contone object and a fifth weight.

The cost function determines that the approximate cost of printing the page is a fifth cost when the printed page is not a purely monochrome page, and one of the following: the determined area of coverage of the detected at least one color object is greater than or equal to the third predetermined threshold, or the first weighted average is greater than or equal to the fourth predetermined threshold. Additionally, the cost function can also determine that the approximate cost of printing the page is a fifth cost when the determined area of coverage of the detected at least one color object is greater than or equal to a second threshold and there are no detected color graphic objects, color low frequency halftone objects, color high frequency halftone objects, color solid fill objects, or color contone objects.

In another aspect of the present disclosure the cost function includes a weighted average function. The weighted average function may include a multiplication of a determined area of coverage of a detected object within the at least one object and a sixth weight.

In another aspect of the present disclosure, a billing system is provided and is implemented by an operative set of processor executable instructions configured for execution by at least one processor. The billing system includes an examination module and a cost calculation module each having an operative set of processor executable instructions configured for execution by the at least one processor. The examination module can examine the content of a page, and includes detection and coverage modules. The detection module can detect at least one object in the page and the coverage module determines an approximate area of coverage of the detected object within the at least one object in the page. The cost calculation module can apply a cost function to approximate the cost of printing the page using the detected object and the determined approximate area of coverage of the detected object.

BRIEF DESCRIPTION OF THE DRAWINGS

These and other advantages will become more apparent from the following detailed description of the various embodiments of the present disclosure with reference to the drawings wherein:

FIG. 3 is a chart depicting several approximated costs that can be used by the method of FIG. 2 which account for the service cost of printing a page in accordance with the present disclosure.

DETAILED DESCRIPTION

Figure 1A:
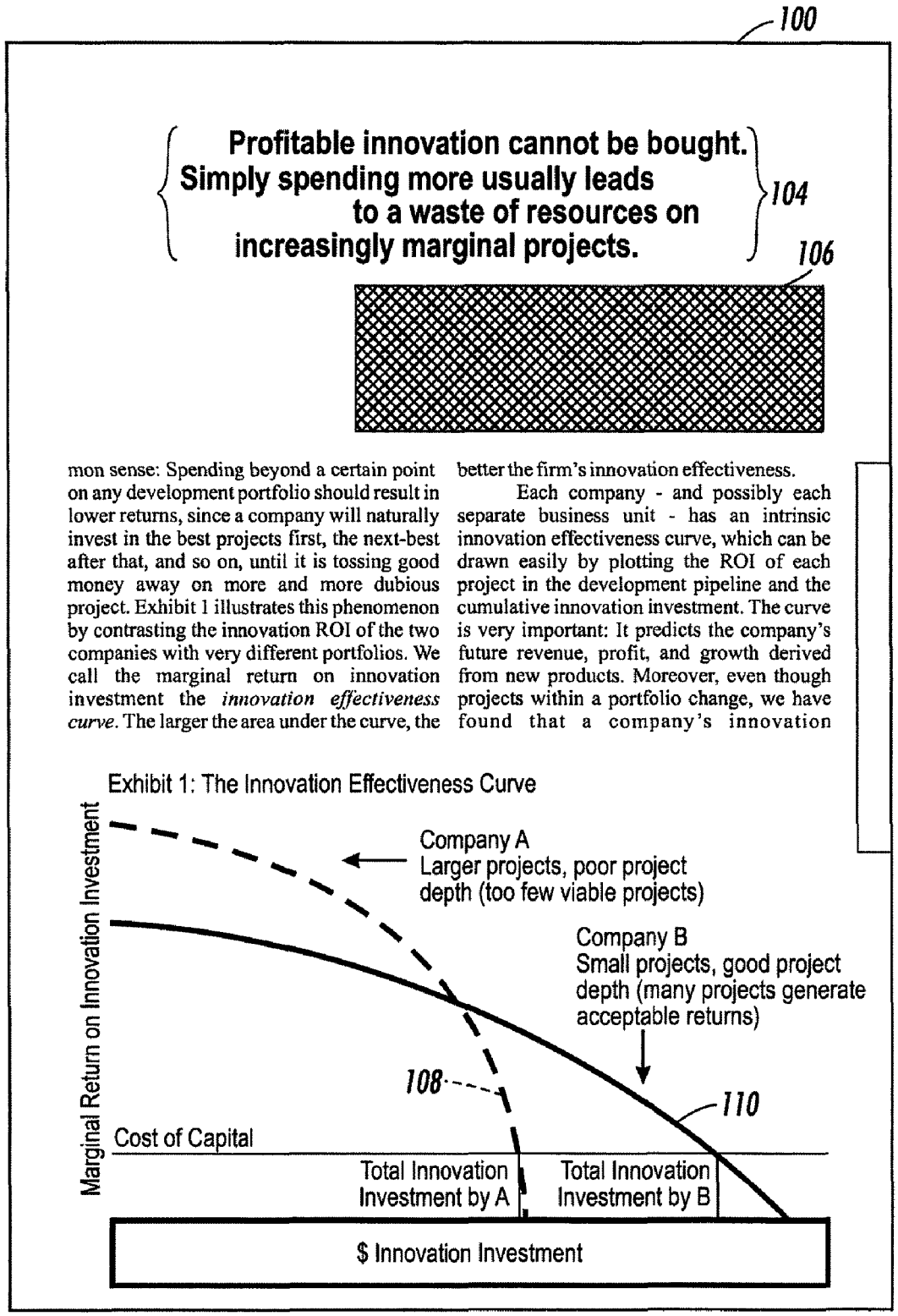
FIGS. 1A and 1B are graphic representations of pages with objects in the pages in accordance with the present disclosure.
Figure 1B:
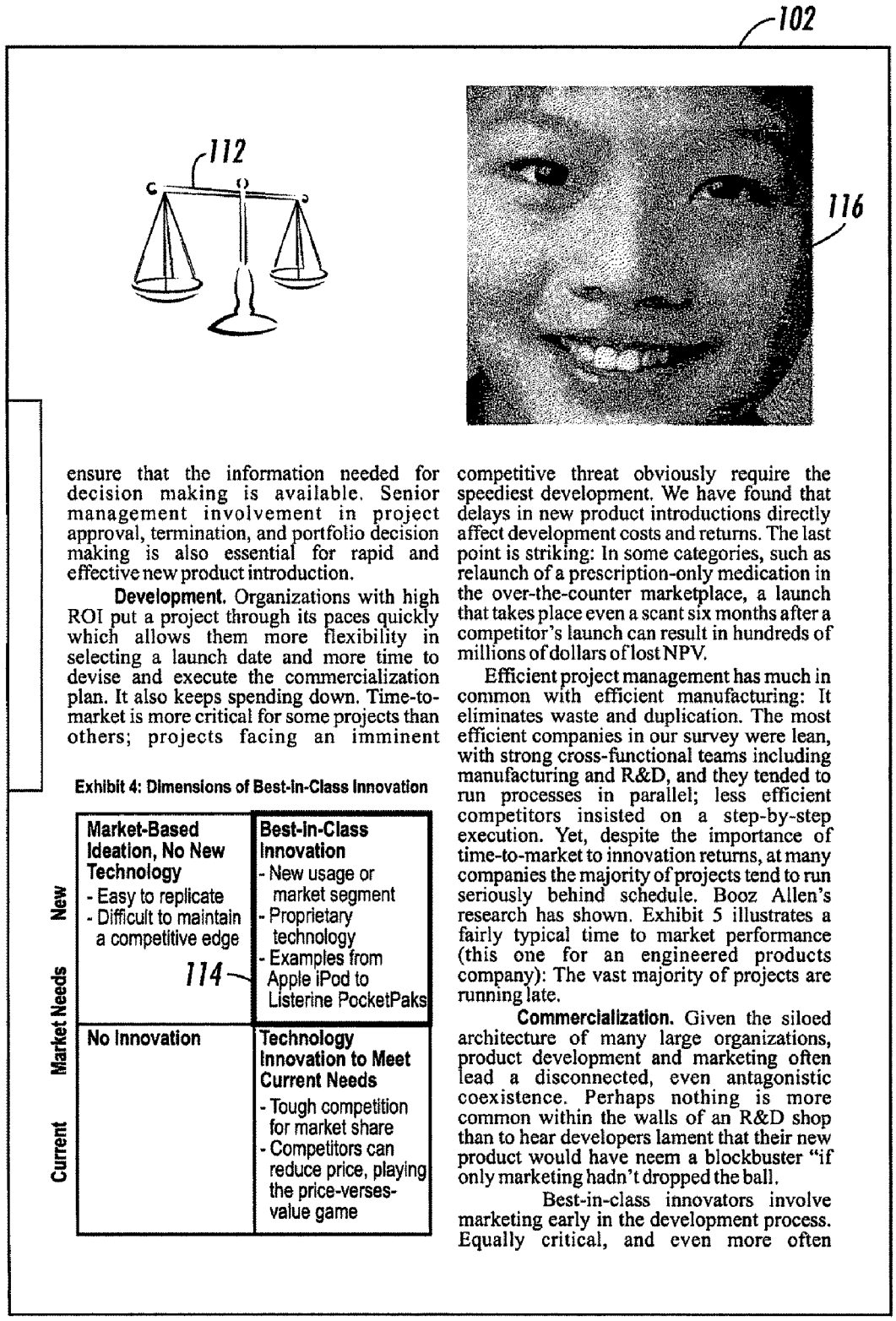

FIGS. 1A and 1B show pages 101 and 102, respectively. Page 100 includes color text object 104, color solid fill object 106, and color line art objects 108 and 110. Page 102 includes color graphic object 112, color low frequency halftone object 114, and color high frequency halftone object 116. The types of objects that may be included in a page are: monochrome contone objects, color contone objects, monochrome text objects, color text objects, monochrome line art objects, color line art objects, monochrome graphic objects, color graphic objects, monochrome low frequency halftone objects, color low frequency halftone objects, monochrome high frequency halftone objects, color high frequency halftone objects, monochrome solid fill objects, and/or color solid fill objects.

A page can take many forms, e.g., pages 100 and 102. A page is simply what is to be marked onto the printing substrate. Two pages may be marked on both sides of the substrate to form a double-sided sheet (e.g., a sheet of paper). A page may be a scanned page, an image of a page, a page description language page, a printed page, a copied page, a computer-memory based page, a hard-drive based page, a raster page, a vector graphics page, or the like. Additionally or alternatively, pages 100 and 102 may be a representation of a page in printed form (e.g., printed pages) or in another form as mentioned supra.

Referring again to only FIGS. 1A and 1B, note that the approximate area of coverage of the color objects in page 100 is about equal to the approximate area of coverage of the color objects in page 102. The "area of coverage" of an object may be a relative or absolute measurement. Also, the "area of coverage" of an object may be the number of pixels of the object and/or the area of the object. Additionally or alternatively, to determine the approximate area of coverage of an object in pages 100 and 102, the method may count the number of pixels of that object. Additionally, the pixels can be counted during ripping of the page and/or using an auto-windowing technique on the page. The auto-windowing technique is described in the U.S. Pat. No. 5,850,474 entitled, "Apparatus and method for segmenting and classifying image data" and U.S. Pat. No. 6,240,205 entitled, "Apparatus and method for segmenting and classifying image data", both of which are assigned to the present assignee and are hereby incorporated by reference.

In one prior art method, pages 100 and 102 would be billed a "per click" fee that was based upon the determined approximate area of coverage of the color objects of pages 100 and 102, respectively, resulting in the two pages being billed at about the same fee when printed, or at exactly the same fee. However, field data has indicated that there is a correlation of the service cost associated with a particular printed page to the page content (e.g., the objects in the page).

For example, a 1×1 inch object when printed on a page may have higher service cost if the object were a color high frequency halftone object as compared to a color low frequency halftone object or a color line art object. The reasons for the additional service costs may be partially due to that the smaller halftone cluster dots make slight color separation misregistrations more objectionable to the human eye as compared to larger halftone cluster dots.

Figure 2:
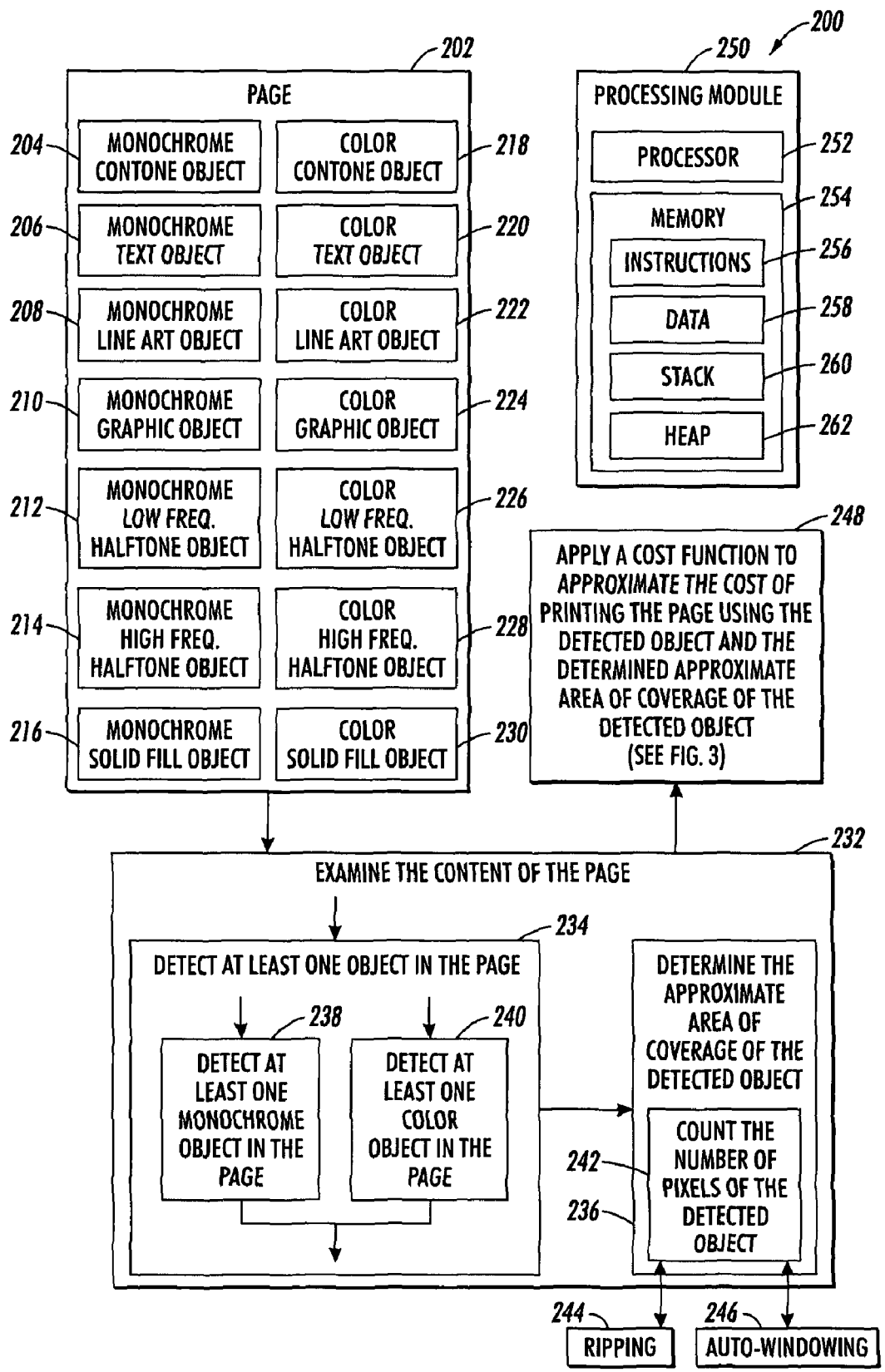
FIG. 2 is a flow chart diagram illustrating a method of billing for printing service costs in accordance with the present disclosure.

Referring to the drawings, FIG. 2 is a flow chart diagram illustrating a method 200 of billing that accounts for printing service costs. Page 202 is shown and includes monochrome contone object 204, monochrome text object 206, monochrome line art object 208, monochrome graphic object 210, monochrome low frequency halftone object 212, monochrome high frequency (abbreviated as "freq.") halftone object 214, monochrome solid fill object 216, color contone object 218, color text object 220, color line art object 222, color graphic object 224, color low freq. halftone object 226, color high freq. halftone object 228, and color solid fill object 230. Also, page 202 is representative of any page (e.g., pages 100 and 102 of FIGS. 1A and 1B) and is used only to illustrate some of the variety of objects that can be detected and used by method 200; however, method 200 may use a page that includes any combinations of objects or no objects.

Step 232 can examine content of page 202 and includes steps 234 and 236. Step 234 can detect at least one object in page 202 while step 236 can determine the approximate area of coverage of the detected object. The at least one object in the page that is referred to in step 234 may include one or more objects.

Step 234 includes steps 238 and 240; step 238 can detect at least one monochrome object in page 202 (e.g., one of objects 204 through 216) and step 240 can detect at least color object in the page (e.g., one of objects 218 through 230). Step 240 can include additional steps (not depicted) such as steps that can detect at least one color contone object, detect at least one color text object, detect at least one color line art object, detect at least one color graphic object, detect at least one color low frequency halftone object, detect at least one color high frequency halftone object, and/or detect at least one color solid fill object.

Method 200 can use one or more of the detected objects of step 234, e.g., step 236 can determine the approximate area of coverage of the detected object (and/or objects) of step 234. A way method 200 can determine the approximate area of coverage of the detected object (e.g., one of objects 204 through 230) is during step 242 which is to count the number of pixels of the detected object. As mentioned above, step 242 may be implemented during ripping 244 and/or during auto-windowing 246.

After an object is detected (e.g., objects 204 through 230) and the approximate area of coverage of the detected object is determined; step 248 can apply a cost function to approximate the cost of printing the page using the detected object (e.g., of step 234).

Note that method 200 may be implemented by using software executable instructions. Specifically, method 200 may be implemented using processing module 250 that includes processor 252 and memory 254. Memory 254 includes instruction 256, data 258, stack 260, and heap 262. Although processing module 250 is shown using "von Newman architecture", method 200 may also be implemented using a processor in the Harvard architecture (not depicted).

The cost function referred to within step 248 may be the one as depicted in FIG. 3. Referring now to FIG. 3, chart 300 depicts several costs that can be used by method 200 of FIG. 2 to approximate the service cost of printing a page. Chart 300 illustrates five determined service costs in column 302 that includes costs C1, C2, C3, C4, and C5. Cost C1, C2, C3, C4, and C5 may include the service cost, may be the service cost, may include other costs, may be used to calculate a fee and/or otherwise can be a cost that accounts (either exactly, approximately or by estimation) for the service cost of printing a page.

Cost C1 can be used to account for the page service cost when the page is a purely monochrome page and the total area of coverage of the monochrome objects is less than threshold T1. The monochrome objects can be detected during step 238 of FIG. 2. However, cost C2 is used to account for the service cost when the page is a purely monochrome page and the total area of coverage of the monochrome objects is greater than or equal to threshold T1.

Costs C3, C4, and C5 apply to pages with color objects. Costs C3 is used to account for service costs when there are color objects in the page (although the page may contain significant amounts of monochrome objects), the total area of the color objects is less than threshold T2, and the page does not include any color graphic objects, color low frequency halftone objects, color high frequency halftone objects, color solid fill objects, or color contone objects.

Cost C4 is determined to be the account for the service cost of printing page 202 (see FIG. 2) when the total area of coverage of the color objects is less than threshold T3 and a weighted average is less than threshold T4. Specifically, refer to column 310 and row 318 of chart 300 for the formula: $G*w1+LFHT*w2+HFHT*w3+SF*w4+CON*w5<$ threshold T4. The formula of column 310 and row 318 expresses that cost C4 is determined when a weighted average is less than threshold T4, the weighted average being a summation of: (1) the total area of coverage of the color graphic objects multiplied by a first weight, (2) the total area of coverage of the low frequency halftone objects multiplied by a second weight, (3) the total area of coverage of the high frequency halftone objects multiplied by a third weight, (4)

the total area of coverage of the solid fill objects multiplied by a fourth weight, and (5) the total area of coverage of the contone objects multiplied by a fifth weight.

Cost C5 is determined to include the estimated service cost of printing a color page when that particular page has objects that place the page outside the requirements to use costs of C3 and/or C4 (note that costs C1 and C2 are associated with approximated costs of purely monochrome pages).

Referring to row 320, cost C5 is used for accounting for the service cost of a page when the page does not include any color graphic objects, low frequency halftone objects, high frequency halftone object, solid fill objects, or color contone objects, but the total area of coverage of the color objects is greater than or equal to threshold T2. Another situation in which cost C5 is used when printing the color page is shown in row 322 and is used when the page includes one or more of: a color graphic object, a color low frequency halftone object, a color high frequency halftone object, a color slid fill object, and a color contone object; and, additionally for the cost C5 to be used (regarding row 322), the page must have one of: (1) the total area of coverage of the color objects is greater than or equal to threshold T3 and/or (2) $G*w1+LFHT*w2+HFHT*w3+SF*w4+CON*w5$ is greater than or equal to threshold T4. Row 322 is to account for the pages that are out of bounds of the additional requirements (column 310 row 318) of cost C4, but satisfy the requirements for cost C4 determination otherwise.

However, referring again to FIG. 2, method 200 may use another cost function in step 248, in another embodiment, that uses a weighted average of the various areas of coverage of any detected objects within a page (e.g., page 202). Additionally, in yet another embodiment, a non-linear cost function may determine costs by using one or more of the detected objects found within the page.

Figure 4:
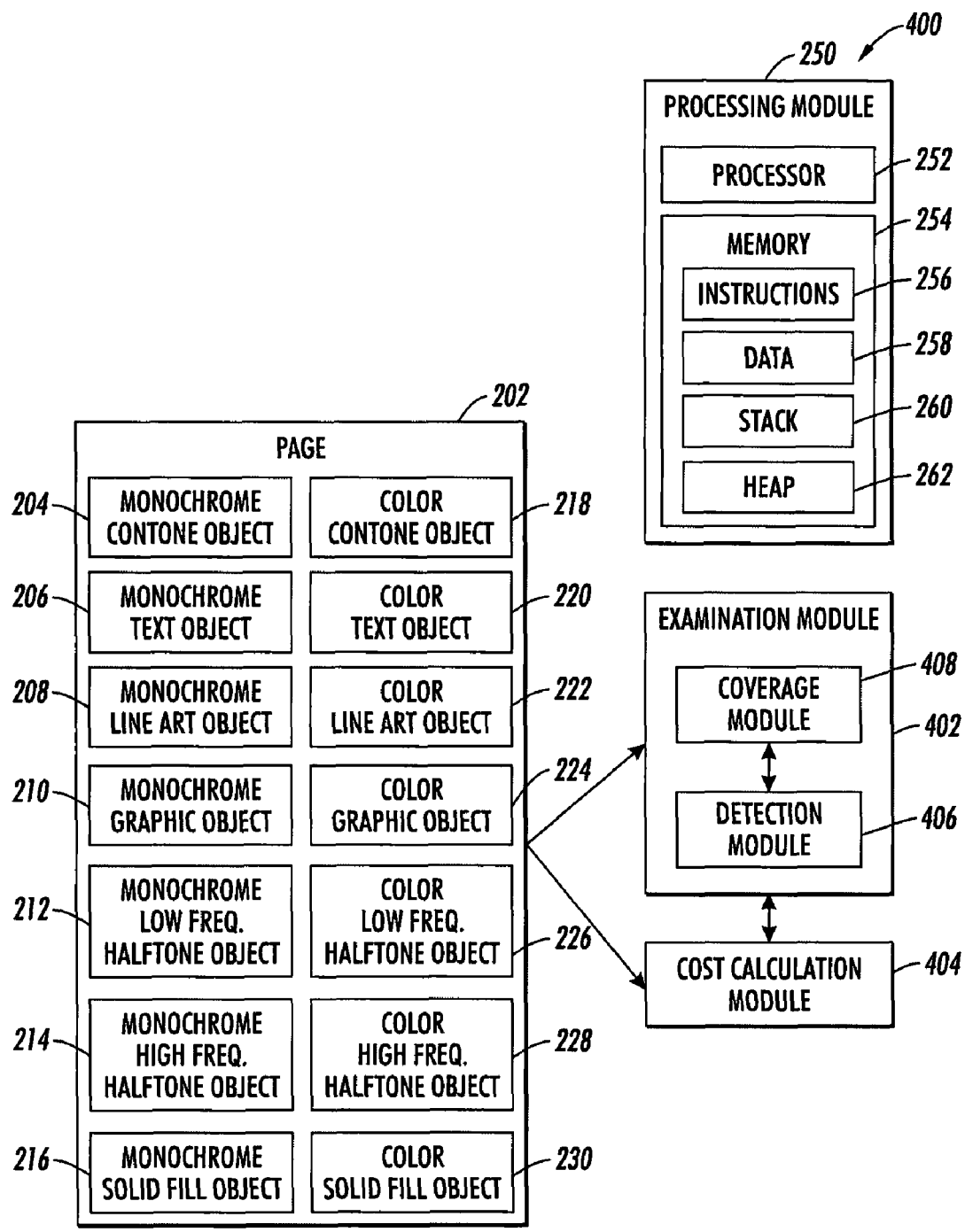
FIG. 4 is a block diagram illustration of a billing system that can bill for printing service costs.

Referring to FIG. 4, a billing system 400 is shown and may be implemented by instructions 256 configured for execution by processor 252. Additionally or alternatively, billing system 400 and its various modules can include hardware, software, software in execution, firmware, and/or some combination thereof.

Examination module 402 and cost calculation module 404 are included in system 400. Page 202 is the representative page that billing system 400 can use to determine the service cost associated with the page. Examination module 402 includes detection module 406 and coverage module 408.

Examination module 402 can examine the content of page 202. The examination may be accomplished using detection module 406 that can detect one or more objects in page 202. Coverage module 408 can determine the approximate area of coverage of a detected object detected by detection module 406. Coverage module 408 can count the number of pixels of the detected object during (1) ripping and/or (2) using the auto-windowing technique mentioned supra. Examination module 402 can operatively communicate with cost calculation module 404. Cost calculation module 404 can use the cost function discussed regarding FIG. 3 to approximate a cost of printing page 202 using objects 204 through 230 (or otherwise objects detected within another page not depicted). Additionally or alternatively, cost calculation module 404 can use any cost function discussed herein.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of billing for printing service costs, comprising the steps of:
examining, by a processor, content of a page comprising:
detecting, by the processor, at least one object in the page; and
determining, by the processor, an approximate area of coverage of a detected object within the at least one object in the page; and
applying, by the processor, a cost function to approximate a cost of printing the page using the detected object and the determined approximate area of coverage of the detected object,
wherein said cost function can determine the cost of printing using a determined cost for printing the page and wherein the determined cost is selected from a plurality of determined costs, wherein the cost function is selected from the group consisting of:
a cost function which includes a weighted average function, wherein the weighted average function includes a multiplication of the determined area of coverage of the detected object and a weight,
a cost function which determines the approximate cost of printing the page based on at least the determined area of coverage of the detected at least one object is less than a predetermined threshold,
a cost function which determines the approximate cost of printing the page based on the determined area of coverage of the detected at least one object is at least a predetermined threshold,
a cost function which determines the approximate cost of printing the page based on at least a weighted average being less than a predetermined threshold, and
a cost function which determines the approximate cost of printing the page based on a color contone object not being detected in the page, wherein the approximate cost of printing the page is one of a plurality of determined costs, each of the plurality of determined costs is based on one or more of at least: (i) different characteristics of images, text, and symbols of the printed page, (ii) a relationship between the determined area of coverage and one or more first predetermined threshold values, and (iii) a relationship between the weighted average and one or more second predetermined values,
wherein the cost function determines that the approximate cost of printing the page is a first determined cost when the printed page is a purely monochrome page; and the determined area of coverage of the detected at least one object is less than a first predetermined threshold;
wherein the cost function determines that the approximate cost of printing the page is a second determined cost when the printed page is a purely monochrome page; and the determined area of coverage of the detected at least one object is at least a first predetermined threshold;
wherein the cost function determines that the approximate cost of printing the page is a third determined cost when the printed page is not a purely monochrome page; a determined area of coverage of a detected at least one color object is less than a second predetermined threshold; a color graphic object is not detected in the page; a color low frequency halftone object is not detected in the page; a color high frequency halftone object is not detected in the page; a color solid fill object is not detected in the page; and a color contone object is not detected in the page; and wherein the cost function determines that the approximate cost of printing the page is a fourth determined cost when the printed page is not a purely monochrome page; a determined area of coverage of a detected at least one color object is less than a third predetermined threshold; and the weighted average is less than the predetermined threshold.

2. The method according to claim 1, wherein the at least one object in the page includes at least one of a monochrome contone object, a color contone object, a monochrome text object, a color text object, a monochrome line art object, a color line art object, a monochrome graphic object, a color graphic object, a monochrome low frequency halftone object, a color low frequency halftone object, a monochrome high frequency halftone object, a color high frequency halftone object, a monochrome solid fill object, and a color solid fill object.

3. The method according to claim 1, wherein the step of detecting the at least one object in the page comprises at least one step of:
   detecting at least one color object; and
   detecting at least one monochrome object.

4. The method according to claim 3, wherein the step of detecting at least one color object comprises at least one of:
   detecting at least one color contone object;
   detecting at least one color text object;
   detecting at least one color line art object;
   detecting at least one color graphic object;
   detecting at least one color low frequency halftone object;
   detecting at least one color high frequency halftone object; and
   detecting at least one color solid fill object.

5. The method according to claim 1, wherein the step of determining the approximate area of coverage of the detected object within the at least one object in the page, comprises:
   counting a number of pixels of the detected object.

6. The method according to claim 5, wherein the step of counting the number of the pixels of the detected object within the at least one object occurs during at least one of: ripping the page and implementing an auto-windowing technique on the page.

7. The method according to claim 1, wherein the page is one of a scanned page, an image of a page, a page description language page, a printed page, a copied page, a computer-memory based page, a hard-drive based page, a raster page, and a vector graphics page.

8. The method according to claim 1, wherein the weighted average is a summation of
   a multiplication of a determined approximate area of coverage of a detected at least one color graphic object and a first weight;
   a multiplication of a determined approximate area of coverage of a detected at least one color low frequency halftone object and a second weight;
   a multiplication of a determined approximate area of coverage of a detected at least one color high frequency halftone object and a third weight;
   a multiplication of a determined approximate area of coverage of a detected at least one color solid fill object and a fourth weight; and
   a multiplication of a determined approximate area of coverage of a detected at least one color contone object and a fifth weight.

9. A method of billing for printing service costs, comprising the steps of:
   examining, by a processor, content of a page comprising:
   detecting, by the processor, at least one object in the page; and
   determining, by the processor, an approximate area of coverage of a detected object within the at least one object in the page; and
   applying, by the processor, a cost function to approximate a cost of printing the page using the detected object and the determined approximate area of coverage of the detected object,
   wherein said cost function can determine the cost of printing using a determined cost for printing the page and wherein the determined cost is selected from a plurality of determined costs, wherein the cost function is selected from the group consisting of:
   a cost function which includes a weighted average function, wherein the weighted average function includes a multiplication of the determined area of coverage of the detected object and a weight,
   a cost function which determines the approximate cost of printing the page based on at least the determined area of coverage of the detected at least one object is less than a predetermined threshold,
   a cost function which determines the approximate cost of printing the page based on the determined area of coverage of the detected at least one object is at least a predetermined threshold,
   a cost function which determines the approximate cost of printing the page based on at least a weighted average being less than a predetermined threshold, and
   a cost function which determines the approximate cost of printing the page based on a color contone object not being detected in the page, wherein the approximate cost of printing the page is one of a plurality of determined costs, each of the plurality of determined costs is based on one or more of at least: (i) different characteristics of images, text, and symbols of the printed page, (ii) a relationship between the determined area of coverage and one or more first predetermined threshold values, and (iii) a relationship between the weighted average and one or more second predetermined values,
   wherein the cost function determines that the approximate cost of printing the page is a first determined cost when the printed page is a purely monochrome page; and the determined area of coverage of the detected at least one object is less than a first predetermined threshold;
   wherein the cost function determines that the approximate cost of printing the page is a second determined cost when the printed page is a purely monochrome page; and the determined area of coverage of the detected at least one object is at least a first predetermined threshold; and
   wherein the cost function determines that the approximate cost of printing the page is a third determined cost when the printed page is not a purely monochrome page; a determined area of coverage of a detected at least one color object is less than a second predetermined threshold; a color graphic object is not detected in the page; a color low frequency halftone object is not detected in the page; a color high frequency halftone object is not detected in the page; a color solid fill object is not detected in the page; and a color contone object is not detected in the page.

10. A method of billing for printing service costs, comprising the steps of:

examining, by a processor, content of a page comprising:

detecting, by the processor, at least one object in the page; and determining, by the processor, an approximate area of coverage of a detected object within the at least one object in the page; and applying, by the processor, a cost function to approximate a cost of printing the page using the detected object and the determined approximate area of coverage of the detected object, wherein said cost function can determine the cost of printing using a determined cost for printing the page and wherein the determined cost is selected from a plurality of determined costs, wherein the cost function is selected from the group consisting of:

a cost function which includes a weighted average function, wherein the weighted average function includes a multiplication of the determined area of coverage of the detected object and a weight, a cost function which determines the approximate cost of printing the page based on at least the determined area of coverage of the detected at least one object is less than a predetermined threshold, a cost function which determines the approximate cost of printing the page based on the determined area of coverage of the detected at least one object is at least a predetermined threshold, a cost function which determines the approximate cost of printing the page based on at least a weighted average being less than a predetermined threshold, and a cost function which determines the approximate cost of printing the page based on a color contone object not being detected in the page, wherein the approximate cost of printing the page is one of a plurality of determined costs, each of the plurality of determined costs is based on one or more of at least: (i) different characteristics of images, text, and symbols of the printed page, (ii) a relationship between the determined area of coverage and one or more first predetermined threshold values, and (iii) a relationship between the weighted average and one or more second predetermined values, wherein the cost function determines that the approximate cost of printing the page is a first determined cost when the printed page is a purely monochrome page; and the determined area of coverage of the detected at least one object is less than a first predetermined threshold;

wherein the cost function determines that the approximate cost of printing the page is a second determined cost when the printed page is a purely monochrome page; and the determined area of coverage of the detected at least one object is at least a first predetermined threshold;

wherein the cost function determines that the approximate cost of printing the page is a third determined cost when the printed page is not a purely monochrome page; a determined area of coverage of a detected at least one color object is less than a second predetermined threshold; a color graphic object is not detected in the page; a color low frequency halftone object is not detected in the page; a color high frequency halftone object is not detected in the page; a color solid fill object is not detected in the page; and a color contone object is not detected in the page; and wherein the cost function determines that the approximate cost of printing the page is a fourth determined cost when the printed page is not a purely monochrome page; a determined area of coverage of a detected at least one color object is less than a third predetermined threshold; and the weighted average is less than the predetermined threshold; and wherein the cost function determines that the approximate cost of printing the page is a fifth determined cost when the printed page is not a purely monochrome page; and at least one of:

a determined area of coverage of a detected at least one color object is at least a second threshold, a color graphic object is not detected in the page, a color low frequency halftone object is not detected in the page, a color high frequency halftone object is not detected in the page, a color solid fill object is not detected in the page, and a color contone object is not detected in the page; the determined area of coverage of the detected at least one color object is at least a third predetermined threshold; and the weighted average is at least the predetermined threshold.

11. The method according to claim 10, wherein the weighted average is a summation of a multiplication of a determined approximate area of coverage of a detected at least one color graphic object and a first weight, a multiplication of a determined approximate area of coverage of a detected at least one color low frequency halftone object and a second weight, a multiplication of a determined approximate area of coverage of a detected at least one color high frequency halftone object and a third weight, a multiplication of a determined approximate area of coverage of a detected at least one color solid fill object and a fourth weight, and a multiplication of a determined approximate area of coverage of a detected at least one color contone object and a fifth weight.

12. A billing system comprising:

a processor configured to execute an operative set of processor executable instructions comprising:

an examination module configured for examining content of a page, the examination module comprising:

a detection module configured for detecting at least one object in the page; and a coverage module configured for determining an approximate area of coverage of a detected object within the at least one object in the page; and a cost calculation module configured for applying a cost function to approximate a cost of printing the page using the detected object and the determined approximate area of coverage of the detected object, wherein said cost function can determine the cost of printing using a determined cost for printing the page and wherein the determined cost is selected from a plurality of determined costs, wherein the cost function is selected from the group consisting of:

a cost function which includes a weighted average function, wherein the weighted average function includes a multiplication of the determined area of coverage of the detected object and a weight, and a cost function which determines the approximate cost of printing based on a weighted average, wherein the approximate cost of printing the page is one of a plurality of determined costs, each of the plurality of determined costs based on one or more of at least: (i) different characteristics of images, text, and symbols of the printed page, (ii) a relationship between the determined area of coverage and one or more first predetermined threshold values, and (iii) a relationship between the weighted average and one or more second predetermined values, wherein the cost function determines that the approximate cost of printing the page is a first determined cost when the printed page is a purely monochrome page; and the determined area of coverage of the detected at least one object is less than a first predetermined threshold;

wherein the cost function determines that the approximate cost of printing the page is a second determined cost when the printed page is a purely monochrome page; and the determined area of coverage of the detected at least one object is at least a first predetermined threshold;

wherein the cost function determines that the approximate cost of printing the page is a third determined cost when the printed page is not a purely monochrome page; a determined area of coverage of a detected at least one color object is less than a second predetermined threshold; a color graphic object is not detected in the page; a color low frequency halftone object is not detected in the page; a color high frequency halftone object is not detected in the page; a color solid fill object is not detected in the page; and a color contone object is not detected in the page; and wherein the cost function determines that the approximate cost of printing the page is fourth determined cost when the printed page is not a purely monochrome page; a determined area of coverage of a detected at least one color object is less than a third predetermined threshold; and the weighted average is less than the predetermined threshold.

13. The billing system according to claim 12, wherein the detection module detects at least one of:
- at least one color object; and
- at least one monochrome object.

14. The billing system according to claim 12, wherein the detection module detects at least one of:
- at least one color contone object;
- at least one color text object;
- at least one color line art object;
- at least one color graphic object;
- at least one color low frequency halftone object;
- at least one color high frequency halftone object; and
- at least one color solid fill object.

15. The method according to claim 12, wherein the cost function determines the cost for printing based on a first weighted average of the at least one weighted average.

16. The method according to claim 12, wherein the cost function determines the cost for printing the page based on the weighted average.

* * * * *